Figure 3:
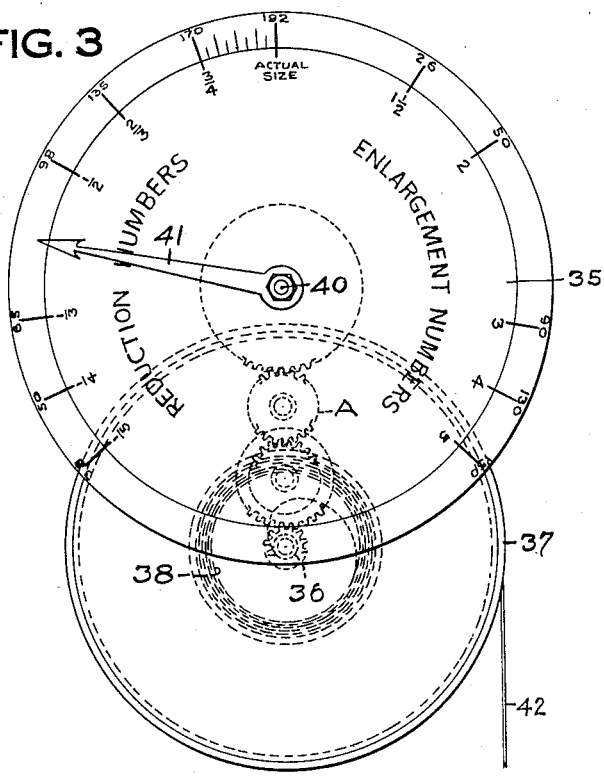

Oct. 7, 1924.
E. F. KINZLER
1,510,942
CAMERA EXTENSION INDICATOR
Filed July 7, 1921
3 Sheets-Sheet 1
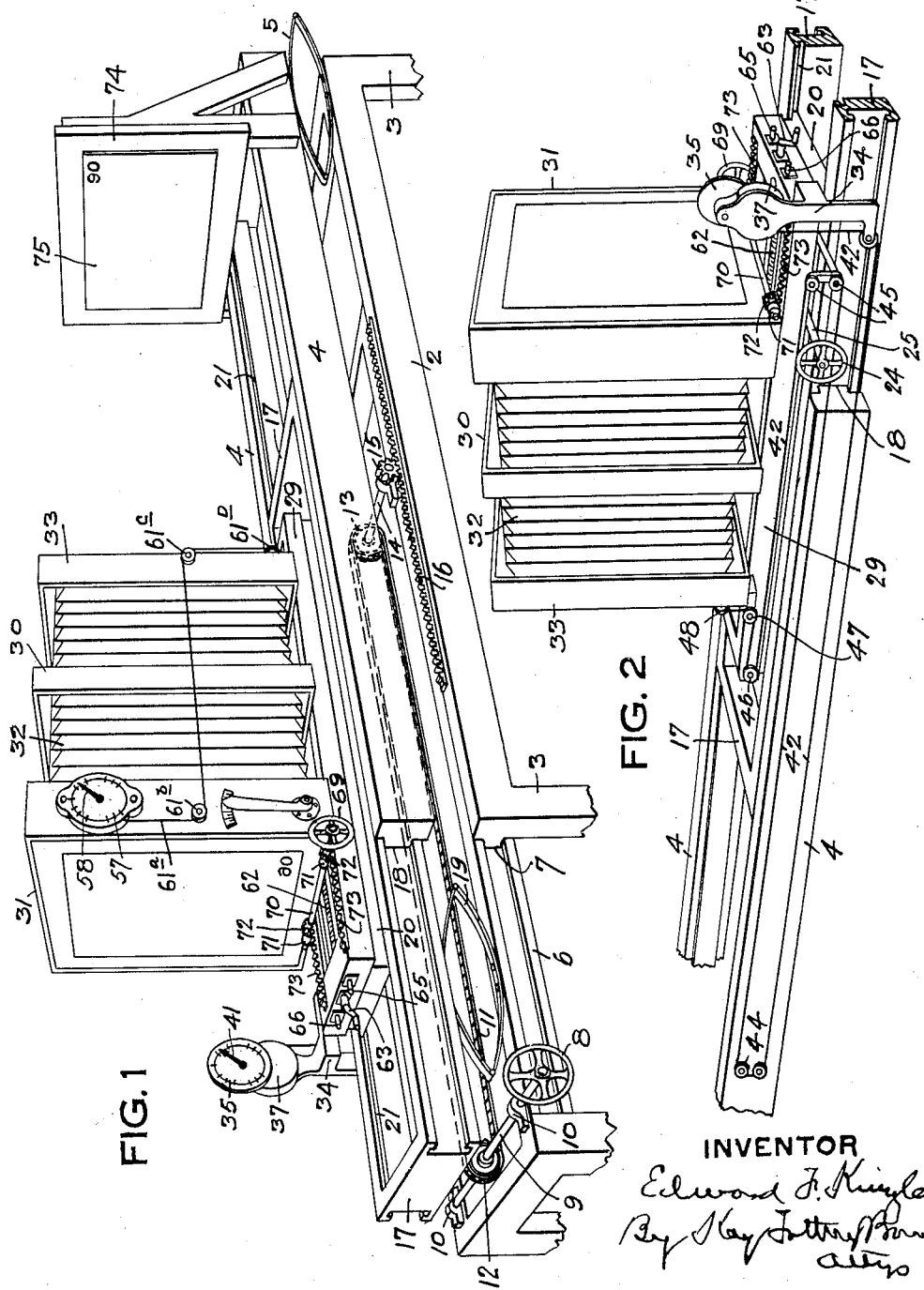
INVENTOR
Edward F. Kinzler
By Kay Totten Brown
attys Oct. 7, 1924.  
E. F. KINZLER  
1,510,942  
CAMERA EXTENSION INDICATOR  
Filed July 7, 1921  
3 Sheets-Sheet 2

INVENTOR  
Edward F. Kinzler

Oct. 7, 1924.

E. F. KINZLER 1,510,942

CAMERA EXTENSION INDICATOR

Filed July 7, 1921

3 Sheets-Sheet 3

INVENTOR
Edward F. Kinzler
By Kay Totten Brown
Attys

Patented Oct. 7, 1924.

1,510,942

UNITED STATES PATENT OFFICE.

EDWARD F. KINZLER, OF PITTSBURGH, PENNSYLVANIA, ASSIGNOR OF ONE-HALF TO ROBERT RAWSTHORNE, JR., OF PITTSBURGH, PENNSYLVANIA.

CAMERA-EXTENSION INDICATOR.

Application filed July 7, 1921. Serial No. 483,011.

*To all whom it may concern:*

Be it known that I, EDWARD F. KINZLER, a citizen of the United States, and resident of Pittsburgh, in the county of Allegheny and State of Pennsylvania, have invented a new and useful Improvement in Camera-Extension Indicators; and I do hereby declare the following to be a full, clear, and exact description thereof.

My invention relates to an indicator for camera and bellows extension.

In an application filed by me May 16, 1921, Serial No. 470,157, I have set forth and described a reduction and enlargement controller particularly adapted for use in photoengraving where all sizes of drawings and copies are received to be rephotographed to certain larger or smaller sizes for process engravings, the object of that invention being to provide a device by means of which the reduction and enlargement numbers may be secured in a few moments, thereby doing away with the slide rule and decimal chart and all the time and labor occasioned thereby. My present invention is particularly adapted for use in connection with such reduction and enlargement controller indicators, being provided with means for moving the camera extension and the bellows extension, so that when the enlargement or reduction number for the drawing is once obtained the camera extension and the bellows extension may be adjusted, so that the indicators will indicate the same enlargement or reduction number, and in a few moments the adjustments may be made to get the right size and focus without measuring and looking for same through the ground focusing glass which is a slow and tedious operation.

Figure 4:
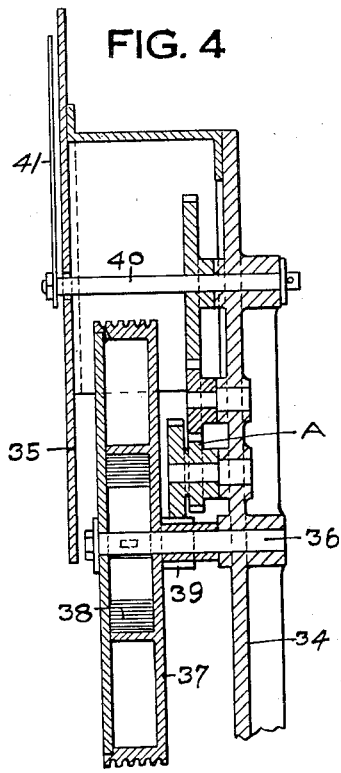
Figure 5:
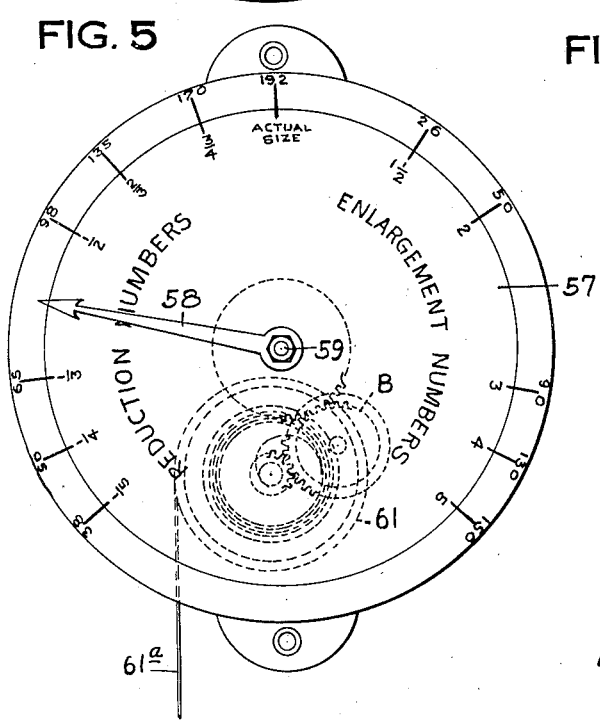
Figure 6:
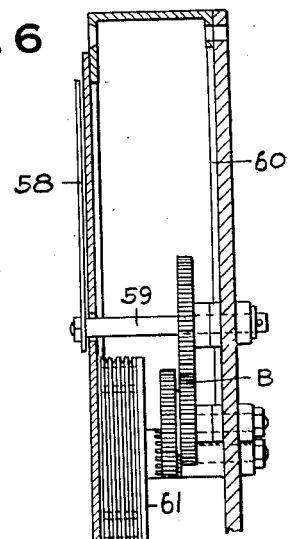
Figure 7:
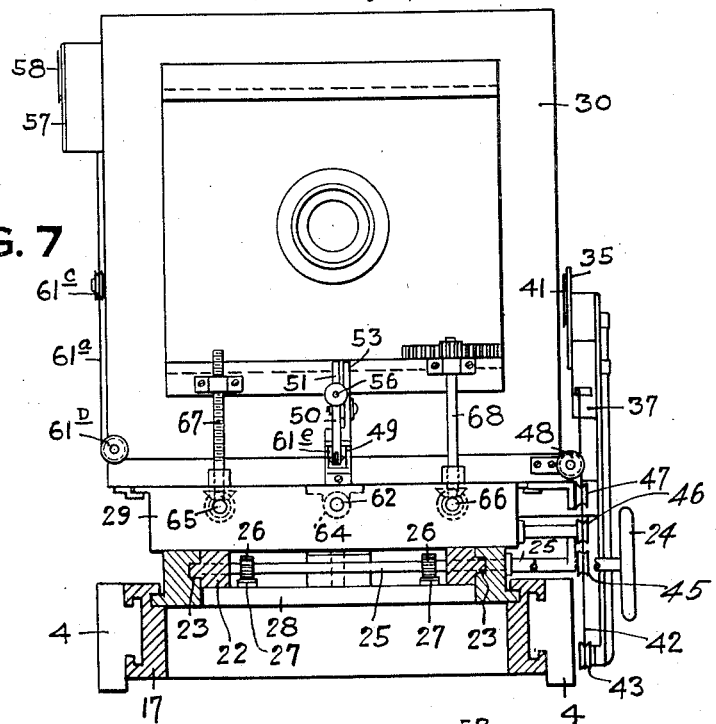
Figure 8:
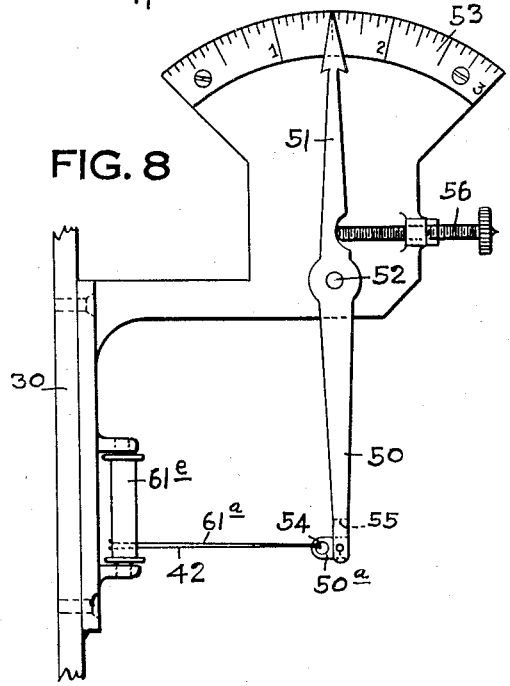

In the accompanying drawings, Fig. 1 is a perspective view of a camera stand of an ordinary construction showing my invention applied thereto; Fig. 2 is a perspective view of a portion of the same from the opposite side; Fig. 3 is an enlarged view of one of the indicator dials showing the gearing connections; Fig. 4 is a sectional view of same; Fig. 5 is a face view of the bellows dial; Fig. 6 is a sectional view of same; Fig. 7 is a cross sectional view of the camera stand and the slides, and showing a front view of the camera; and Fig. 8 is an enlarged detail of the indicator for use where allowance is to be made for thickness of the copy.

In the drawings the numeral 2 designates a common form of camera stand provided with legs 3. Supported on the stand 2 is the frame 4, said frame resting on the elliptic springs 5 secured to the stand 2.

The stand 2 has the extension 6 moving in guides 7 in said stand, and to provide for the movement back and forth of the extension 6 a hand-wheel 8 is provided mounted on the shaft 9 journaled in suitable bearings 10 on the extension 6. An endless chain 11 is mounted on sprocket-wheels 12 and 13, the sprocket-wheel 13 being mounted on the shaft 14. The shaft 14 carries the pinion 15 which meshes with the rack 16 on the stand 2. It will be apparent that by rotating the hand-wheel 8 the extension 6 may be moved back and forth.

A main-slide or carriage 17 moves in guides 18 in the frame 4, and the forward end of the slide 17 is supported by the elliptic springs 19 secured to the extension 6.

A slide 20 engages guides 21 in the main-slide or carriage 17.

Within the slide 20 is a short slide 22 (see Fig. 7) moving in guides 23 in the slide 20. To operate the slide 22 a hand-wheel 24 is provided mounted on the shaft 25. The shaft 25 carries the pinions 26 which mesh with the rack 27 carried by the cross-bars 28 on the slide 20.

Mounted on the slide 22 and pivotally mounted thereon is the camera-slide 29. A suitable camera 30 is mounted on the camera-slide, said camera having the customary rear frame 31, the bellows 32 and the lens frame 33.

The bracket 34 is secured to the camera-slide 29 and said bracket carries at its upper end the dial 35. Mounted on a stationary shaft 36 in the bracket 34 is the loosely mounted drum 37. Within the drum is the coil spring 38, one end of which is secured to the shaft 36 and the other to the drum. The drum has the pinion 39 which drives a train of reduction gearing A to operate the shaft 40 carrying the indicator hand 41 moving over the dial 35.

The dial 35 is properly graduated, half the dial having enlargement numbers and the other half reduction numbers, all corresponding to the reduction and enlargement numbers of the reduction and enlargement controller above referred to.

Wound around the drum 37 is the cord or line 42, preferably a heavy trout line, said line passing down around the sheave 43 at the foot of the bracket 34, around the sheaves 44 on the frame 4, back and around the sheaves 45 on the slide 20, thence around the sheave 46 on the camera-slide 29, thence around the sheave 47 on the lens frame 33, over sheave 48, around the drum 49, and thence to the lower end of the arm 50 of the indicator hand 51 pivoted at 52 on the thickness of copy dial 53.

The line 42 passes through an eye 54 in the link 50$^a$, pivotally mounted in the slot 55 in the arm 50, so that whatever angle the arm 50 takes the line 42 will extend straight out from the drum 49. A set-screw 56 engages the indicator hand 51 and prevents the movement of said hand to the right, Fig. 8, when there is a pull on the line 42.

On the frame 31 is the dial 57 with the indicator hand 58 mounted on the shaft 59. Within the casing 60 is the spring actuated drum 61. A train of gearing B connects the drum with the shaft 59.

A line 61$^a$ winds around the drum 61 and passes around sheaves 61$^b$, 61$^c$, 61$^d$ to the drum 61$^e$ and thence to the link 50$^a$ at the lower end of arm 50.

A screw-shaft 62 is mounted in the camera-slide 29 to be operated by a handle 63. The inner end of said screw-shaft engages the nut 64 on the lens frame 33, and by rotating said screw-bar the lens-box may be moved back and forth all in the ordinary manner.

Vertical and lateral adjustment of the lens is obtained in the ordinary manner by turning the shafts 65 and 66 respectively, which operate through suitable gearing to rotate the screw 67 and the shaft 68.

To expand or contract the bellows, a hand-wheel 69 is provided which rotates the shaft 70 mounted in suitable bearings 71. This shaft 70 carries the pinions 72 which engage rack-bars 73 on the camera-slide 29 At the outer end of the frame 4 is the frame or support 74 for supporting the picture or copy 75 to be photographed.

In the operation of the device, if the copy which is fastened to the board or frame 74 has any material thickness, as where the copy may be part of a book, allowance has to be made for such thickness. The operator turns the screw 56$^a$ and moves the indicator finger 51 on the dial 53 to a point corresponding to the thickness of the copy. If it is 1½ inches thick the indicator hand is moved from the extreme left, Fig. 8, to the graduation corresponding to the 1½ inches, and the screw 56 is locked to hold the indicator hand in this position. This movement of the indicator hand will operate through the lines 42 and 61$^a$ to move the indicator hands 41 and 58 of the dials 35 and 57 accordingly. The operator then extends the extension 6 by turning the hand-wheel 8, and as the slides 17 and 20 are carried by the extension 6 said slides will move with said extension. This is only in case large reductions are to be made. After the extension 6 has been extended to its full length the slide 17 may then be moved by hand to a further distance, and the camera-slide 29 may then be adjusted independently of the slide 17.

Previous to mounting the copy 75 on the board 74, said copy has been marked with its proper reduction or enlargement number, obtained preferably by the use of my reducing and enlargement controller above referred to, and let it be assumed that the enlargement number is 90. The adjustment of the camera by means of the different slides is made until the indicator hand 41 of the dial 35 points to 90 on the reduction side of the dial.

To obtain the proper extension of the bellows, the operator turns the hand-wheel 69, and the frame 31 is moved until the indicator hand 58 registers with the number 90 on the dial 57. It will be apparent that by turning the handle 63 of the screw shaft 62, both indicating dials 35 and 57 will be operated simultaneously to indicate the camera extension as well as the bellows extension.

In this manner, in a few moments the camera is adjusted to get the desired size and focus without measuring and looking for same on the ground glass which is a slow and tedious operation. After the enlargement or reduction number has once been obtained and marked on the drawing, it is a very simple and easy matter to adjust the camera in proper position for such enlargement or reduction, and as the operations all take place from one side of the camera stand where the hand wheels are located, no time is lost in having to move from one side of the stand to the other.

Where the camera is to be swung around at right angles to the stand, the hand-wheel 24 is employed to adjust the camera where fine adjustment is required, and the short slide-frame 22 is moved back and forth in the slide 20.

What I claim is:

1. In a device of the character described, the combination with a suitable frame, of a carriage movable back and forth on said frame, a camera on said carriage, a dial for indicting the camera extension, an indicator hand on said dial, means for operating said hand by the movement of said carriage, a dial on said camera for indicating the bellows extension, an indicator hand for said last-named dial, and means for operating said last-named indicator hand by the expansion or contraction of the bellows.

2. In a device of the character described, the combination with a suitable frame, of a carriage movable back and forth on said frame, a camera on said carriage, a dial for indicating the camera extension, an indicator hand on said dial, a dial on said camera for indicating the bellows extension, and means for operating the hands of both dials simultaneously.

3. In a device of the character described, the combination of a frame, a carriage movable back and forth thereon, a spring actuated drum carried by said carriage, a line engaging said drum, a dial, an indicator hand on said dial, connections between said drum and said indicator hand, guiding sheaves on said frame and carriage engaged by said line, and a fixed support to which said line is connected.

4. In a device of the character described, the combination of a camera having a bellows extension, a dial and indicator hand mounted on a movable portion of said camera, a spring actuated drum, connections between said drum and said indicator hand, a line wound around said drum, and a fixed support for the free end of said line.

5. In a device of the character described, the combination of a camera having a bellows extension, a dial and indicator hand mounted on a movable portion of said camera, a spring actuated drum, connections between said drum and said indicator hand, a line wound around said drum, a fixed support for the free end of said line, and means for moving said movable portion.

6. In a device of the character described, the combination with a camera, of a scale for thickness of copy, an indicator hand moving over said scale, means for adjusting and holding said indicator hand at a point on said scale, a size indicator dial, and connections between said indicator hand and said size indicator dial.

7. In a device of the character described, the combination with a camera, of a scale for thickness of copy, an indicator hand moving over said scale, means for adjusting and holding said indicator hand in position, a focus indicator dial, and connections between said indicator hand and said focus indicator dial.

8. In a device of the character described, the combination with a suitable frame, of a slide movable back and forth thereon, a camera supported by said slide, a dial on said camera, an indicator hand on said dial, a spring actuated drum carried by said slide, a line engaging said drum, connections between said drum and said indicator hand, a thickness of copy scale, an indicator finger moving over same, means for adjusting and holding said finger at a certain point thereon, and said line being connected to said indicator hand.

In testimony whereof, I, the said EDWARD F. KINZLER, have hereunto set my hand.

EDWARD F. KINZLER.

Witnesses:
 JOHN F. WILL,
 ROBT. D. TOTTEN.